US008678663B2

(12) United States Patent
Ciulla

(10) Patent No.: US 8,678,663 B2
(45) Date of Patent: Mar. 25, 2014

(54) WHEEL HUB ASSEMBLY WITH TWO ROWS OF ROLLING ELEMENTS

(75) Inventor: Luca Ciulla, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 321 days.

(21) Appl. No.: 13/090,635

(22) Filed: Apr. 20, 2011

(65) Prior Publication Data

US 2011/0254352 A1 Oct. 20, 2011

(30) Foreign Application Priority Data

Apr. 20, 2010 (IT) .............................. TO2010A0326

(51) Int. Cl.
*F16C 33/58* (2006.01)

(52) U.S. Cl.
USPC .......................................... 384/544; 384/516

(58) Field of Classification Search
USPC ................................................. 384/544, 516
See application file for complete search history.

(56) References Cited

U.S. PATENT DOCUMENTS

| 5,501,530 | A | * | 3/1996 | Nagai et al. | .................... | 384/516 |
| 6,082,906 | A | * | 7/2000 | Satou et al. | .................... | 384/516 |
| 8,007,182 | B2 | * | 8/2011 | Mock et al. | .................... | 384/544 |
| 2005/0111771 | A1 | | 5/2005 | Shevket | | |
| 2009/0052823 | A1 | | 2/2009 | Komori et al. | | |
| 2009/0232435 | A1 | | 9/2009 | Ohtsuki | | |
| 2011/0235958 | A1 | * | 9/2011 | Norimatsu | .................... | 384/544 |

FOREIGN PATENT DOCUMENTS

| EP | 1722115 A2 | 11/2006 |
| WO | WO2005008085 A1 | 1/2005 |

* cited by examiner

*Primary Examiner* — Thomas R Hannon
(74) *Attorney, Agent, or Firm* — Bryan Peckjian; SKF USA Inc. Patent Dept.

(57) ABSTRACT

A wheel hub assembly with two rows of rolling elements has a central axis of rotation and inner raceway and outer raceways for each row of elements, the associated inner and outer raceways being axially displaced in accordance with a respective angle of contact and along a respective load line such that the assembly is capable of accommodating combined loading. The raceways of each row of rolling elements have osculation ratios which are defined by the ratio between the radius of curvature of the raceways and the outside diameters of the rolling elements of the associated row of rolling elements. The angle of contact and the osculation ratios of a first one of the two rows of the rolling elements are different than the angle of contact and osculation ratios of a second one of the two rows of the rolling elements.

17 Claims, 2 Drawing Sheets

WHEEL HUB ASSEMBLY WITH TWO ROWS OF ROLLING ELEMENTS

CROSS REFERENCE

This application claims priority to Italian Patent Application No. TO2010A000326 filed on Apr. 20, 2010, the contents of which are incorporated fully herein by reference.

BACKGROUND OF THE INVENTION

The present invention relates to bearings, and more particularly to a wheel hub assembly with two rows of rolling elements.

Wheel hub assemblies with two rows of rolling elements generally have an axis of rotation and include an inner ring, an outer ring arranged coaxially with and externally to the inner ring and, for each row of rolling elements, an inner raceway and an outer raceway formed, respectively, on the outside of the inner ring and on the inside of the outer ring which are axially displaced with respect to one another to allow the wheel hub assembly to accommodate combined loads, i.e. loads that act simultaneously in a radial direction and in an axial direction.

The wheel hub assemblies of the type described above are used in countless applications in the automobile field, and have undergone substantial structural modifications up to the incorporation in the inner and outer rings of flanges connecting to the wheels and chassis, thereby contributing to the creation of compact and light structures, as well as guaranteeing both simplified assembly, and increasingly greater reliability.

Because of the increasingly restrictive anti-pollution regulations that have come into effect in recent years, it has been necessary to study technological solutions aimed, even indirectly, at reducing the energy consumption of automobiles and noxious emissions for the environment such as, for example, carbon monoxide emissions.

SUMMARY OF THE INVENTION

The object of the present invention is to create a wheel hub assembly with two rows of rolling elements which, while maintaining high mechanical characteristics and high reliability, permits a significant reduction in consumption and pollutant emissions.

According to the present invention, there is provided a wheel hub assembly with two rows of rolling elements with an axis of rotation and comprising, for each row of rolling elements, an inner raceway and an outer raceway which are axially displaced in accordance with a respective angle of contact and along a respective load line in order to allow the assembly to accommodate combined loads, the raceways of each row of rolling elements having respective osculation ratios which are defined by the ratio between the radius of curvature of the raceways and the outside diameters of the rolling elements of the associated row of rolling elements; the wheel hub assembly being characterized in that the dimensions of the angle of contact and of the osculation ratios of a first row of rolling elements of the two rows of rolling elements are different from the dimensions of the angle of contact and, respectively, of the osculation ratios of a second row of rolling elements of the two rows of rolling elements.

BRIEF DESCRIPTION OF THE SEVERAL VIEWS OF THE DRAWINGS

The invention will now be described with reference to the attached drawings which illustrate a few non-limitative exemplary embodiments, in which.

DETAILED DESCRIPTION OF THE INVENTION

Figure 1:
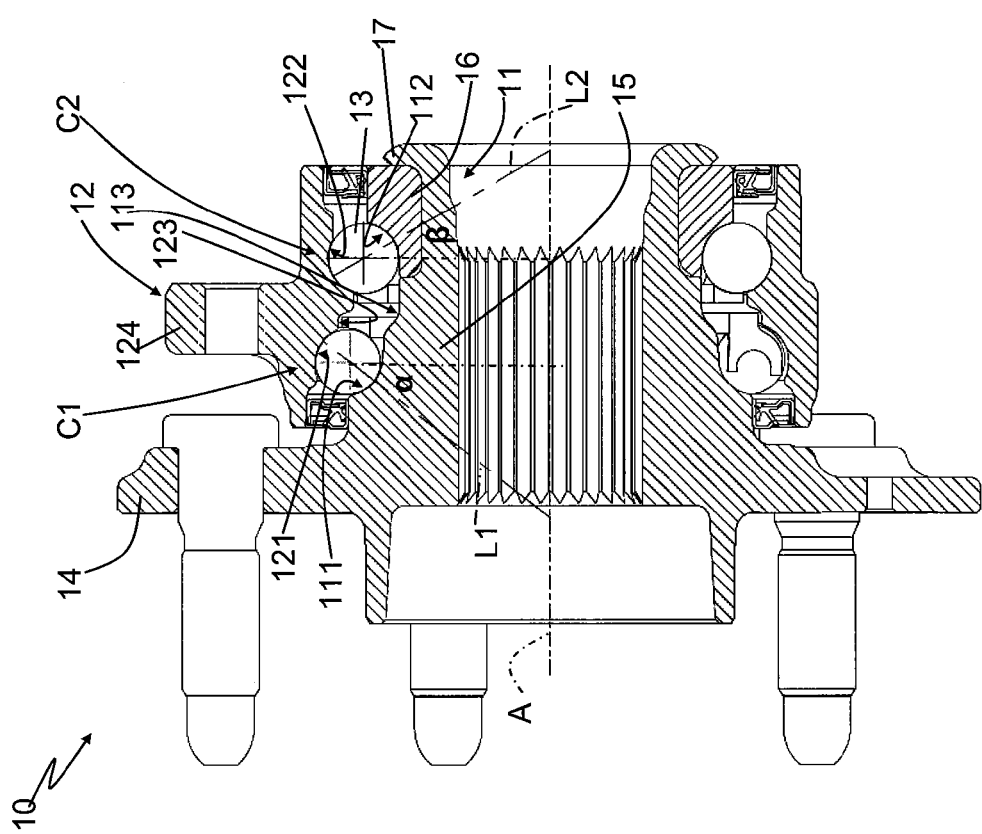
FIG. 1 illustrates, in cross section, a first preferred embodiment of a wheel hub assembly with two rows of rolling elements according to the present invention.

With reference to FIG. 1, a dual row wheel hub assembly 10 in accordance with the present invention has an axis A of rotation and preferably includes an inner ring 11 generally centered about the axis A, an outer ring 12 disposed coaxially about the inner ring 11, and two rows C1, C2 of rolling elements 13 disposed between the rings 11, 12. The two rings 11, 12 are angularly displaceable relative to each other due to the two rows C1, C2 of rolling elements 13. In the example described herein, the rolling elements 13 are balls, the centers of which are arranged along respective pitch diameters P1, P2, but could alternatively be any other appropriate type of bearing roller elements.

More specifically, the wheel hub assembly 10 basically comprises first and second inner raceways 111, 112 disposed about the central axis of rotation A, the first row C1 of rolling elements 13 being disposed on the first inner raceway 111 and the second row C2 of rolling elements 13 disposed on the second inner raceway 112, a first outer raceway 121 disposed generally about spaced from the first inner raceway 111 and a second outer raceway 122 disposed generally about the second inner raceway 112. The first outer raceway 112 is axially spaced from the first inner raceway such that a first load line L1 through the first row C1 of rolling elements 13 defines a first angle $\alpha$ of contact with respect to the central axis A. Further, the second outer raceway 122 is axially spaced from the second inner raceway 112 such that a second load line L2 through the second row C2 of rolling elements 13 defines a second angle $\beta$ of contact with respect to the central axis A. The load lines L1, L2 join the points of contact between the balls 13 of each row C1, C2 with the associated inner rows 111, 112 and the associated outer raceways 121, 122, and form the respective angles $\alpha$ and $\beta$ of contact with lines perpendicular to the axis A on a radial plane. With the above structure, the assembly 10 is capable of accommodating combined loads, i.e., loading which acts simultaneously in the radial direction and in the axial direction, which are transmitted between balls 13 and inner raceways 111, 112 and between balls 13 and outer raceways 121, 122 along respective load lines L1, L2.

Further, each of the first and second inner raceways 111, 112 and each of the first and second outer raceways 121, 122 have a radius of curvature, each rolling element 13 of the first row C1 has a first outside diameter $\Phi 1$, and each rolling element 13 of the second row C2 has a second outside diameter $\Phi 2$. As such, the first row C1 of rolling elements 13 has an osculation ratio $O_{OE}$ defined between the radius of curvature of the first outer raceway 121 and the first outside diameter $\Phi 1$ and another osculation ratio $O_{OI}$ defined between radius of curvature of the first inner raceway 111 and the first outside diameter $\Phi 1$. Also, the second row C2 of rolling elements 13 has an osculation ratio $O_{IE}$ defined between radius of curvature of the second outer raceway 122 and the second rolling element outside diameter $\Phi 2$ and another osculation ratio $O_{II}$ defined between the radius of curvature of the second inner raceway 112 and the second outside diameter $\Phi 2$. Preferably, wheel hub assembly 10 is constructed such that the first angle α of contact has a value different than a value of the second angle β of contact, and each of the two osculation ratios $O_{OE}$, $O_{OI}$ of the first row C1 of rolling elements 13 has a value different than the value of the corresponding osculation ratios $O_{IE}$, $O_{II}$, respectively, of the second row C2 of rolling elements 13, as discussed in greater detail below.

The inner raceways 111, 112 are preferably formed outside or externally of the inner ring 11, while the outer raceways 121, 122 are preferably formed directly on an inner surface 123 of the outer ring 12 which, in the example of embodiment illustrated, is also provided with an outer flange 124 for anchoring the assembly 10 to a vehicle (not shown). The inner ring 11 is preferably a flanged ring configured for attaching the wheel hub assembly 10 to a wheel (not shown). Most preferably, the ring 11 includes a flange 14 extending generally transversely to the axis A of rotation, a spindle 15 extending generally along the axis A of rotation and made of the same material as the flange 14 (i.e., the flange and spindle are integrally formed), and an inner ring 16 mounted on the spindle 15, which is axially retained or "blocked" by a rolled edge 17.

The flange 14 and the ring 16 define, for the assembly 10, the so-called "outboard side" and, respectively, the "inboard side", and the inner raceway 111 of the row C1 is formed directly on an outer surface 113 of the spindle 15 in the vicinity of the flange 14, while the inner raceway 112 of the row C2 is formed directly on the ring 16. Alternatively, according to a form of embodiment that is not illustrated, the inner raceway 111 of row C1 can also be formed directly on a respective ring in an intermediate position between the flange 14 and the ring 16 and axially blocked by the flange 14 and ring 16 themselves.

In the exemplary embodiment illustrated, the dimensions of the pitch diameter P1 of the row C1 are greater than those of the pitch diameter P2 of row C2. However, everything described in this disclosure may also be advantageously applied to a wheel hub assembly in which the dimensions of the pitch diameter P1 of the row C1 are the same as the dimensions of the pitch diameter P2 of the row C2. For the sake of clarity, it is nevertheless worth underlining that an asymmetrical wheel hub assembly with a pitch diameter P1 of the row C1, i.e. of the "outboard side" row, that is greater than the pitch diameter P2 of the row C2, i.e. of the row on the "inboard side", has, with all the other dimensions being the same, greater rigidity than a symmetrical wheel hub assembly in which the dimensions of the pitch diameters of P1 and P2 are the same.

As discussed above, the raceways 111, 112, 121, 122 have respective osculation ratios $O_{xy}$ which are defined as the ratio between the radius of curvature r of the raceways 111, 112, 121, 122 and the associated one of the first and second outside diameters Φ1, Φ2 of the balls 13 of each row C1, C2. Specifically, the following osculation ratios are obtained:

$O_{OE}$: the ratio between the radius of curvature of the first outer raceway 121, outboard side, and the first outside diameter Φ1;

$O_{IE}$: the ratio between the radius of curvature of the second outer raceway 122, inboard side, and the second outside diameter Φ2;

$O_{OI}$: the ratio between the radius of curvature of the first inner raceway 111, outboard side, and the first outside diameter Φ1; and $O_{II}$: the ratio between the radius of curvature of the second inner raceway 112, inboard side, and the second outside diameter Φ2.

In the exemplary embodiment illustrated, in order to reduce slippage between the balls 13 and the associated raceways 111, 112, 121 and 122, i.e., reducing the friction between rolling elements and raceways and, thereby also reducing a possible source of dissipation of energy or for the purpose of reducing consumption and pollutant emissions, in the wheel hub assembly 10, the osculation ratios $O_{OE}$ and $O_{OI}$ of the first row C1 of rolling elements 13 are different from the respective osculation ratios $O_{IE}$ and $O_{II}$ of the second row C2 of rolling elements 13, as mentioned above. The best performance in terms of friction reduction is obtained when the wheel hub assembly 10 is made according to any one of the following geometrical conditions:

1) $O_{OE} > O_{IE}$; or
2) $O_{OI} > O_{II}$; or
3) $O_{OE} > O_{IE}$ and $O_{OI} > O_{II}$.

In particular, it was found that the optimum conditions in terms of friction reduction are obtained when the wheel hub assembly 10 is made according to any one of the following geometrical conditions:

1) $O_{OE} > 1.004\ O_{IE}$; or
2) $O_{OI} > 1.004\ O_{II}$; or
3) $O_{OE} > 1.004\ O_{IE}$ and $O_{OI} > 1.004\ O_{II}$.

Figure 3:
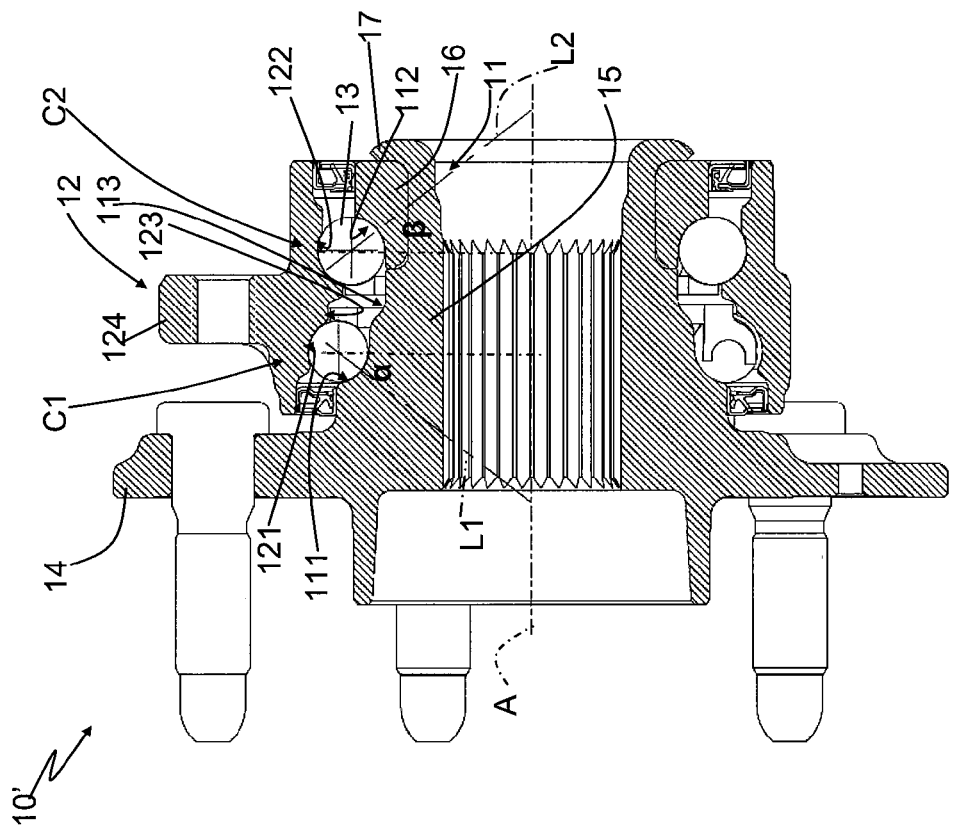
FIG. 3 illustrates, in cross section, a second preferred embodiment of a wheel hub assembly with two rows of rolling elements of FIG. 1.

The different osculation ratios of the outboard side compared with the inboard side can be attained either by varying the radius of curvature of the associated raceways 111, 121 of the outboard side compared with the radius of curvature of raceways 112, 122 of the inboard side, or by varying the outside diameters Φ1, Φ2 of the balls 13. In other words, the different osculation ratios of the outboard side compared with the inboard side can be obtained by making a wheel hub assembly 10', as alternatively illustrated in FIG. 3, in which the first outside diameters Φ1 of the balls 13 of the first row C1 do not have the same dimensions as the dimensions of the second outside diameters Φ2 of the balls 13 of the second row C2 of rolling elements 13, as in the exemplary embodiment described above, but in which the first outside diameters Φ1 of the balls 13 of the first row C1 have a value lesser than the value of the second outside diameters Φ2 of the balls 13 of the second row C2.

The reduction of the outside diameters Φ1 of the balls 13 entails, with the same dynamic and structural conditions described above, a reduction of the tangential velocity between balls 13 and raceways and, therefore, a reduction of friction.

In addition to the beneficial effects in terms of reduction of the friction between rolling elements and raceways as described above as an effect of the osculation ratios. For the same reduction purposes, the wheel hub assembly 10 described above, just like the wheel hub assembly 10' with balls 13 of different outside diameters, also has magnitudes of the angles α, β of contact that differ from one another and, in particular, the angle α of contact of the row C1 has a greater magnitude than the magnitude of the angle β of contact of the row C2.

Figure 2:
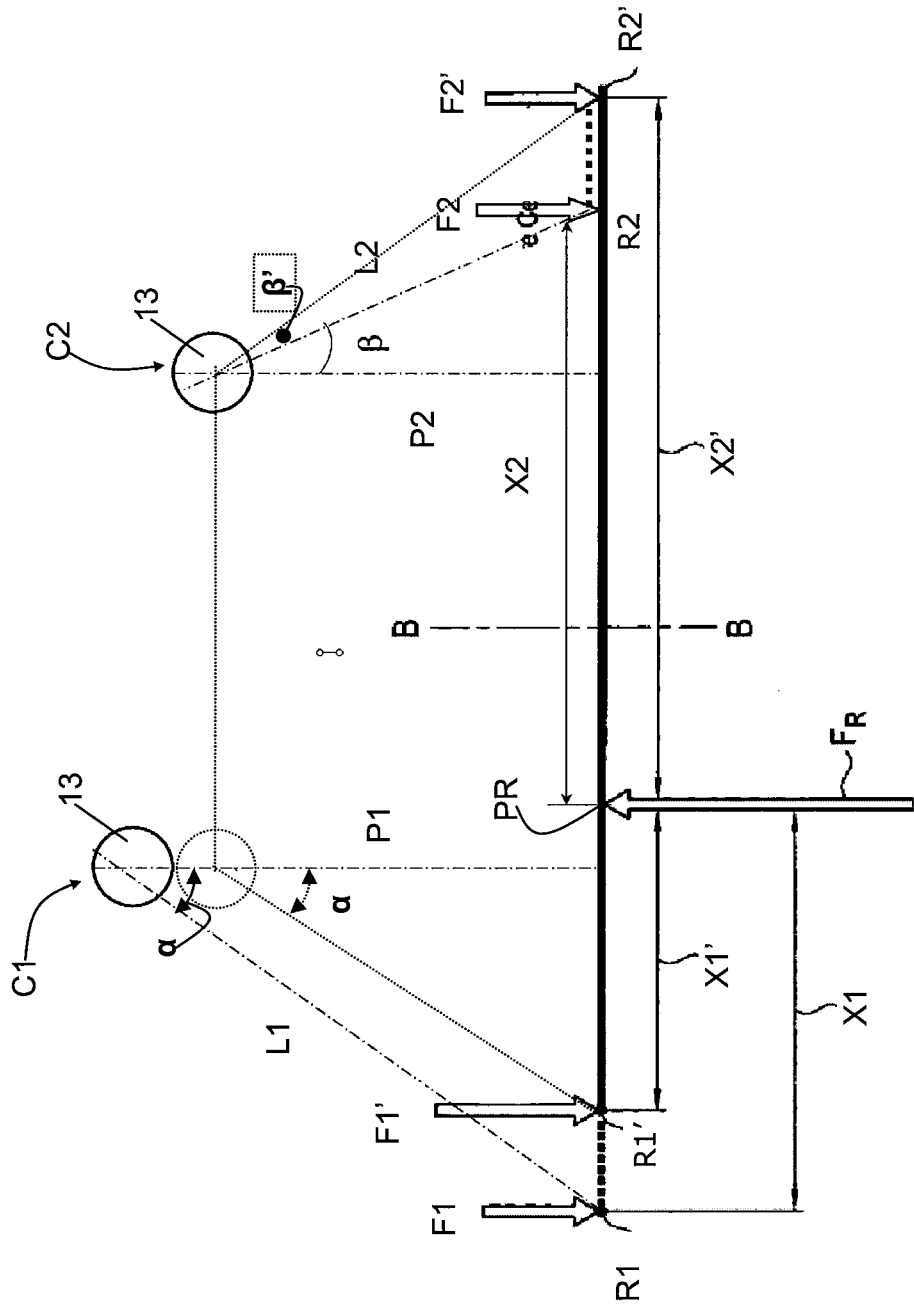
FIG. 2 is a schematic diagram of the distribution of the loads of the wheel hub assembly in FIG. 1.

FIG. 2 provides a schematic illustration of the load diagram of the wheel hub assembly 10 of the present invention in the case in which it is subjected to a wheel load FR applied at a pressure center PR arranged along the axis A of rotation. The first and second rows C1, C2 of rolling elements 13 of the wheel hub assembly 10, when subjected to the wheel load FR, react with respective reaction forces F1, F2, respectively, which are applied at the respective reaction centers R1, R2, identified along the axis A of intersection of the associated lines L1, L2 of force with the axis A, and are at axial distances X1, X2 respectively from the pressure center PR. In particular, it has been found that the optimum conditions in terms of reduction of friction are obtained when the values of the trigonometric tangents of the two angles α, β of contact are related by the following equation:

$$tg\beta = tg\alpha * \left[\frac{X2+X1}{X1} - \frac{X2}{X1}*K\right]$$

where:

$$K = \frac{P1}{P2}$$

With reference to FIG. 2, if the wheel hub assembly is symmetrical, i.e. with k equal to 1, and if the angles α, β' of contact have the same magnitude, the reaction forces, indicated in this case by F1', F2' would be applied in respective reaction centers R1', R2' at axial distances X1', X2' respectively from the pressure center PR.

Considering the load diagram of the symmetric wheel hub assembly 10 (i.e., k=1), but with different amplitudes of the angles α, β of contact, i.e., with the amplitude of the angle β smaller than the magnitude of the angle α and smaller than the magnitude of the angle β' and compared with the load diagram of a symmetric wheel hub assembly and with the same magnitudes of the angles α, β' of contact, the reaction center R2 of the reaction force F2 is displaced to an axial distance X2 that is less than the distance X2' with a resultant increase in the intensity of the reaction force F2. However, the reduction of the magnitude of the angle β of contact gives rise, at kinematic level, to a reduction in the revolution speed of the balls 13 around the axis A with a consequent reduction of the friction between balls 13 and raceways 112, 122.

On the other hand, when the wheel hub assembly 10 is asymmetric, i.e., k is greater than one, and the angles α, β of contact have different amplitudes, the reaction center R1 of the reaction force F1 will be displaced, compared with the previous case of a symmetric wheel hub assembly, to an axial distance X1 greater than the distance X1' with a resulting decrease in the intensity of the reaction force F2 itself and a better distribution of the reaction forces F1, F2 without any substantial variation of the speed of revolution of the balls 13 of the row C1 around the axis A. Therefore, in an asymmetric wheel hub assembly 10, as well as benefitting from greater rigidity, there is also the benefit of better distribution of the forces, thereby allowing the balls 13 of each row C1, C2 to work in better load conditions and with less friction between the raceways and the balls 13 to reduce fuel consumption and pollutant emissions.

Therefore, as what has been described above can also be advantageously applied to a symmetric wheel hub assembly in which the dimensions of the pitch diameter P1 of the row C1 are the same as the dimensions of the pitch diameter P2 of the row C2, it should also be understood that the above can also be applied advantageously to an asymmetric wheel hub assembly in which, however, the value of the pitch diameter P1 of the row C1 is lesser than the value of the pitch diameter P2 of the row C2.

It is intended that the invention not be limited to the embodiments described and illustrated here, which are to be considered as examples of embodiments of the wheel hub assembly with two rows of rolling elements and is, instead, open to further modifications as regards shapes and arrangements of parts, and constructional and assembly details. Thus, it will be appreciated by those skilled in the art that changes could be made to the embodiments described above without departing from the broad inventive concept thereof, and that this invention is intended to cover modifications within the spirit and scope of the present invention as generally defined in the appended claims.

I claim:

1. A wheel hub assembly having an outboard side configured to attach to a wheel and an inboard side configured to attach to a vehicle body, the assembly comprising:
   first and second inner raceways disposed about a central axis of rotation, each one of the first and second inner raceways having a radius of curvature;
   a first row of rolling elements disposed on the first inner raceway and a second row of rolling elements disposed on the second inner raceway, each rolling element of the first row having a first outside diameter and each rolling element of the second row having a second outside diameter; and
   first and second outer raceways each having a radius of curvature, the first outer raceway being disposed generally about and axially spaced from the first inner raceway such that a first load line through the first row of rolling elements defines a first angle of contact with respect to the central axis, and the second outer raceway being disposed generally about and axially spaced from the second inner raceway such that a second load line through the second row of rolling elements defines a second angle of contact with respect to the central axis; and
   wherein the first row of rolling elements has an osculation ratio defined between the first outer raceway radius of curvature and the first rolling element outside diameter and another osculation ratio defined between the first inner raceway radius of curvature and the first outside diameter, the second row of rolling elements has an osculation ratio defined between the second outer raceway radius of curvature and the second rolling element outside diameter and another osculation ratio defined between the second inner raceway radius of curvature and the second outside diameter, the first angle of contact has a value different than a value of the second angle of contact, and each of the two osculation ratios of the first row of rolling elements has a value different than a value of the corresponding osculation ratio of the second row of rolling elements, and
   wherein the osculation ratio between the radius of curvature of the first outer raceway and the first rolling element outside diameter has a value which is greater than a value of the osculation ratio between the radius of curvature of the second outer raceway and the second rolling element outside diameter, and
   wherein the first row of rolling elements is located outboard of the second row of rolling elements.

2. The wheel hub assembly according to claim 1, wherein the osculation ratio between the radius of curvature of the first outer raceway and the first rolling element outside diameter is at least 1.004 times greater than the osculation ratio between the radius of curvature of the second outer raceway and the second rolling element outside diameter.

3. The wheel hub assembly according to claim 2, wherein the first rolling element outside diameter is one of substantially equal to the second rolling element outside diameter and lesser than the second rolling element outside diameter.

4. The wheel hub assembly according to claim 1, wherein the first angle of contact has a magnitude greater than a magnitude of the second angle of contact.

5. The wheel hub assembly according to claim 4, wherein a wheel load applied to a pressure center located along the central axis generates a first reaction force in the first row of rolling elements and a second reaction force in the second row of rolling elements, the first reaction force being applied at a first reaction center and the second reaction being applied at a second reaction center, and wherein the values of the trigonometric tangent of the first and second angles of contact are related in accordance with the following equation:

$$tg\beta = tg\alpha * \left[ \frac{X2 + X1}{X1} - \frac{X2}{X1} * K \right]$$

where:
K equals P1 divided by P2;
X1 is an axial distance between the first reaction center and the pressure center;
X2 is an axial distance between the second reaction center and the pressure center;
P1 is a pitch diameter of the first row of rolling elements;
P2 is a pitch diameter of the second row of rolling elements;
α is the first angle of contact; and
β is the second angle of contact.

6. The wheel hub assembly according to claim 5, wherein the pitch diameter of the first row of rolling elements is equal to the pitch diameter of the second row of rolling elements.

7. The wheel hub assembly according to claim 5, wherein the pitch diameter of the first row of rolling elements is greater than the pitch diameter of the second row of rolling elements.

8. The wheel hub assembly according to claim 5, wherein:
the pitch diameter of the first row of rolling elements is one of equal to and greater than the pitch diameter of the second row of rolling elements; and
the wheel hub assembly further comprises an inner ring generally centered about the axis and an outer ring disposed coaxially about the inner ring, the first and second inner raceways being disposed externally of the inner ring and the first and second outer raceways being disposed internally of the outer ring.

9. The wheel hub assembly according to claim 8, wherein the inner ring has a flange extending generally transversely to the central axis and configured for connecting the wheel hub assembly to a wheel.

10. The wheel hub assembly according to claim 9, wherein the first inner raceway is formed on the inner ring and generally proximal to the flange.

11. The wheel hub assembly according to claim 10, wherein the inner ring further includes a generally axially-extending spindle formed integrally with the flange, the first inner raceway being provided by an outer surface of the spindle.

12. The wheel hub assembly according to claim 11, wherein the inner ring further includes a ring mounted on the spindle and providing the second inner raceway.

13. The wheel hub assembly according to claim 12, wherein the first and second outer raceways are provided by inner surfaces of the outer ring.

14. A wheel hub assembly having an outboard side configured to attach to a wheel and an inboard side configured to attach to a vehicle body, the assembly comprising:
first and second inner raceways disposed about a central axis of rotation, each one of the first and second inner raceways having a radius of curvature;
a first row of rolling elements disposed on the first inner raceway and a second row of rolling elements disposed on the second inner raceway, each rolling element of the first row having a first outside diameter and each rolling element of the second row having a second outside diameter; and
first and second outer raceways each having a radius of curvature, the first outer raceway being disposed generally about and axially spaced from the first inner raceway such that a first load line through the first row of rolling elements defines a first angle of contact with respect to the central axis, and the second outer raceway being disposed generally about and axially spaced from the second inner raceway such that a second load line through the second row of rolling elements defines a second angle of contact with respect to the central axis; and
wherein the first row of rolling elements has an osculation ratio defined between the first outer raceway radius of curvature and the first rolling element outside diameter and another osculation ratio defined between the first inner raceway radius of curvature and the first outside diameter, the second row of rolling elements has an osculation ratio defined between the second outer raceway radius of curvature and the second rolling element outside diameter and another osculation ratio defined between the second inner raceway radius of curvature and the second outside diameter, the first angle of contact has a value different than a value of the second angle of contact, and each of the two osculation ratios of the first row of rolling elements has a value different than a value of the corresponding osculation ratio of the second row of rolling elements, and
wherein the osculation ratio between the radius of curvature of the first inner raceway and the first rolling element outside diameter has a value which is greater than a value of the osculation ratio between the radius of curvature of the second inner raceway and the second rolling element outside diameter, and
wherein the first row of rolling elements is located outboard of the second row of rolling element.

15. The wheel hub assembly according to claim 14, wherein the osculation ratio between the radius of curvature of the first inner raceway and the first rolling element outside diameter is at least 1.004 times greater than the osculation ratio between the radius of curvature of the second inner raceway and the second rolling element outside diameter.

16. The wheel hub assembly according to claim 15, wherein the first rolling element outside diameter is one of substantially equal to the second rolling element outside diameter and lesser than the second rolling element outside diameter.

17. A wheel hub assembly having an outboard side configured to attach to a wheel and an inboard side configured to attach to a vehicle body, the assembly comprising:
a first inner raceway and a second inner raceway disposed about a central axis of rotation, the first inner raceway having a radius of curvature and the second inner raceway having a radius of curvature;
a first row of rolling elements disposed on the first inner raceway and a second row of rolling elements disposed on the second inner raceway, each rolling element of the first row of rolling elements having a first outside diameter and each rolling element of the second row of rolling elements having a second outside diameter; and
a first outer raceway having a radius of curvature and a second outer raceway having a radius of curvature, the first outer raceway being disposed around and axially spaced from the first inner raceway such that a first load line through the first row of rolling elements defines a first angle of contact with respect to the central axis, and the second outer raceway being disposed around and axially spaced from the second inner raceway such that a second load line through the second row of rolling elements defines a second angle of contact with respect to the central axis;

wherein the first row of rolling elements has a first osculation ratio defined between the first outer raceway radius of curvature and the first rolling element outside diameter and a second osculation ratio defined between the first inner raceway radius of curvature and the first outside diameter, wherein the second row of rolling elements has a third osculation ratio defined between the second outer raceway radius of curvature and the second rolling element outside diameter and a fourth osculation ratio defined between the second inner raceway radius of curvature and the second outside diameter, wherein the first angle of contact has a value different than a value of the second angle of contact, wherein the first osculation ratio is greater than the third osculation ratio, wherein the second osculation ratio is different than the fourth osculation ratio, and wherein the first row of rolling elements is located to the outboard side of the second row of rolling elements.

* * * * *